(12) United States Patent
Ginskey et al.

(10) Patent No.: US 7,114,648 B2
(45) Date of Patent: Oct. 3, 2006

(54) NETWORKED TIME-KEEPING SYSTEM

(75) Inventors: David R. Ginskey, Wichita, KS (US); Robert R. Barger, Valley Center, KS (US); M. Lance Chastain, Wichita, KS (US)

(73) Assignee: Stratitec, Inc., Wichita, KS (US)

( * ) Notice: Subject to any disclaimer, the term of this patent is extended or adjusted under 35 U.S.C. 154(b) by 0 days.

(21) Appl. No.: 11/048,499

(22) Filed: Jan. 31, 2005

(65) Prior Publication Data

US 2006/0169765 A1   Aug. 3, 2006

(51) Int. Cl.
*G06K 7/10* (2006.01)

(52) U.S. Cl. ..................................... 235/377
(58) Field of Classification Search ............... 235/382, 235/377, 462.01, 380, 385; 340/539.11, 340/572.1; 705/5.1, 39, 7
See application file for complete search history.

(56) References Cited

U.S. PATENT DOCUMENTS

| | | | | |
|---|---|---|---|---|
| 4,270,043 A | * | 5/1981 | Baxter et al. ................ 235/419 |
| 4,401,994 A | * | 8/1983 | Witts et al. ..................... 346/83 |
| 5,497,141 A | * | 3/1996 | Coles et al. ............. 340/309.7 |
| 5,717,867 A | * | 2/1998 | Wynn et al. .................... 705/32 |
| 6,490,443 B1 | * | 12/2002 | Freeny, Jr. .................. 455/406 |
| 6,914,914 B1 | * | 7/2005 | Flood et al. ................. 370/503 |
| 2002/0010518 A1 | * | 1/2002 | Reid et al. ..................... 700/31 |
| 2003/0088656 A1 | * | 5/2003 | Wahl et al. .................. 709/223 |
| 2003/0167238 A1 | * | 9/2003 | Zeif ............................ 705/400 |
| 2003/0191700 A1 | * | 10/2003 | Horne et al. ................... 705/32 |
| 2003/0234651 A1 | * | 12/2003 | Nguyen ....................... 324/500 |
| 2004/0058706 A1 | * | 3/2004 | Williamson et al. ......... 455/557 |
| 2004/0089713 A1 | * | 5/2004 | Weaver ....................... 235/380 |
| 2004/0153477 A1 | * | 8/2004 | Meadows ................ 707/104.1 |
| 2004/0223515 A1 | * | 11/2004 | Rygielski et al. ........... 370/503 |
| 2005/0033619 A1 | * | 2/2005 | Barnes et al. ................... 705/7 |
| 2005/0086159 A1 | * | 4/2005 | Laiwalla et al. .............. 705/39 |
| 2005/0087424 A1 | * | 4/2005 | Newsome et al. .......... 194/320 |
| 2005/0108434 A1 | * | 5/2005 | Witchey ..................... 709/246 |
| 2005/0127185 A1 | * | 6/2005 | Wilz et al. ............. 235/462.48 |
| 2005/0128076 A1 | * | 6/2005 | Shinada et al. ......... 340/539.11 |
| 2005/0131769 A1 | * | 6/2005 | Flynn et al. .................. 705/26 |
| 2005/0198099 A1 | * | 9/2005 | Motsinger et al. .......... 709/200 |
| 2005/0210252 A1 | * | 9/2005 | Freeman et al. ............ 713/171 |
| 2005/0259722 A1 | * | 11/2005 | Vanlonden et al. ......... 375/145 |

* cited by examiner

*Primary Examiner*—Thien M. Le
*Assistant Examiner*—Thien T. Mai
(74) *Attorney, Agent, or Firm*—Lathrop & Gage LC

(57) ABSTRACT

Disclosed is time keeping system for an employer. The system includes one or more time-keeping network appliances. Each of these appliances includes a small web server. The system also includes some form of employee interface which enables the employee to submit, and the time keeper to receive, identification information regarding the employee. One embodiment uses at least one of a card reader, punch key pad, bar code reader, or proximity badge reader. These devices are used to clock employees in and out. The system also optionally includes an audio-output device to give the employee audio feedback during clock in and an LCD to give the employee visual feed back. If a second network device is included in the system, it is automatically set up as a client of the original time keeper introduced into the system.

15 Claims, 1 Drawing Sheet

NETWORKED TIME-KEEPING SYSTEM

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to the field of monitoring and maintaining the time worked by employees. More specifically, the present invention is directed using computer networks to keeping employee time, notifying supervisors of timekeeping regularities.

2. Description of the Related Art

Traditionally, employee worked time was recorded manually. Later, punch in/punch out systems were developed. These systems comprised an electronic device which included a clock. When an employee clocked in, he or she would take a card, insert it into the device, and the "in" time would be stamped on a designated spot on the card. Anytime that employee would leave the work place, he our she would clock out by stamping a designated "out" portion on said card with the time at which the employee departed the place of work. At a predesignated time, typically at the end of the week, a personnel manager would take all of the employee's time cards, manually calculate the time worked by each, and determine pay. Any irregularities would be difficult to detect. This is because the manager would have to have detailed knowledge of each employee's normal work, schedule, work time authorizations, and other specifics to identify any irregularity. Thus, because the task would be so arduous, oftentimes errors, e.g., an employee working unauthorized overtime, would be overlooked.

Later, sophisticated software systems were created. These software applications would be loaded on existing computers in a facilities computer network and would use an automated clock in clock out system. These systems, however, are very expensive and must be loaded onto the clients in the network.

Therefore, there is a need in the art for an automated time and attendance system which does not have the aforementioned disadvantages.

SUMMARY OF THE INVENTION

The present invention provides a device and method which overcomes the disadvantages present in the prior art methods by providing a time keeping system for an employer. The system includes one or more time-keeping network appliances. Each of these appliances includes a small web server. The system also includes at least one of a card reader, punch key pad, bar code reader, proximity badge reader, or some other kind of identification interface. These devices are used to clock employees in and out. The system also optionally includes an audio-output device to give the employee audio feedback.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
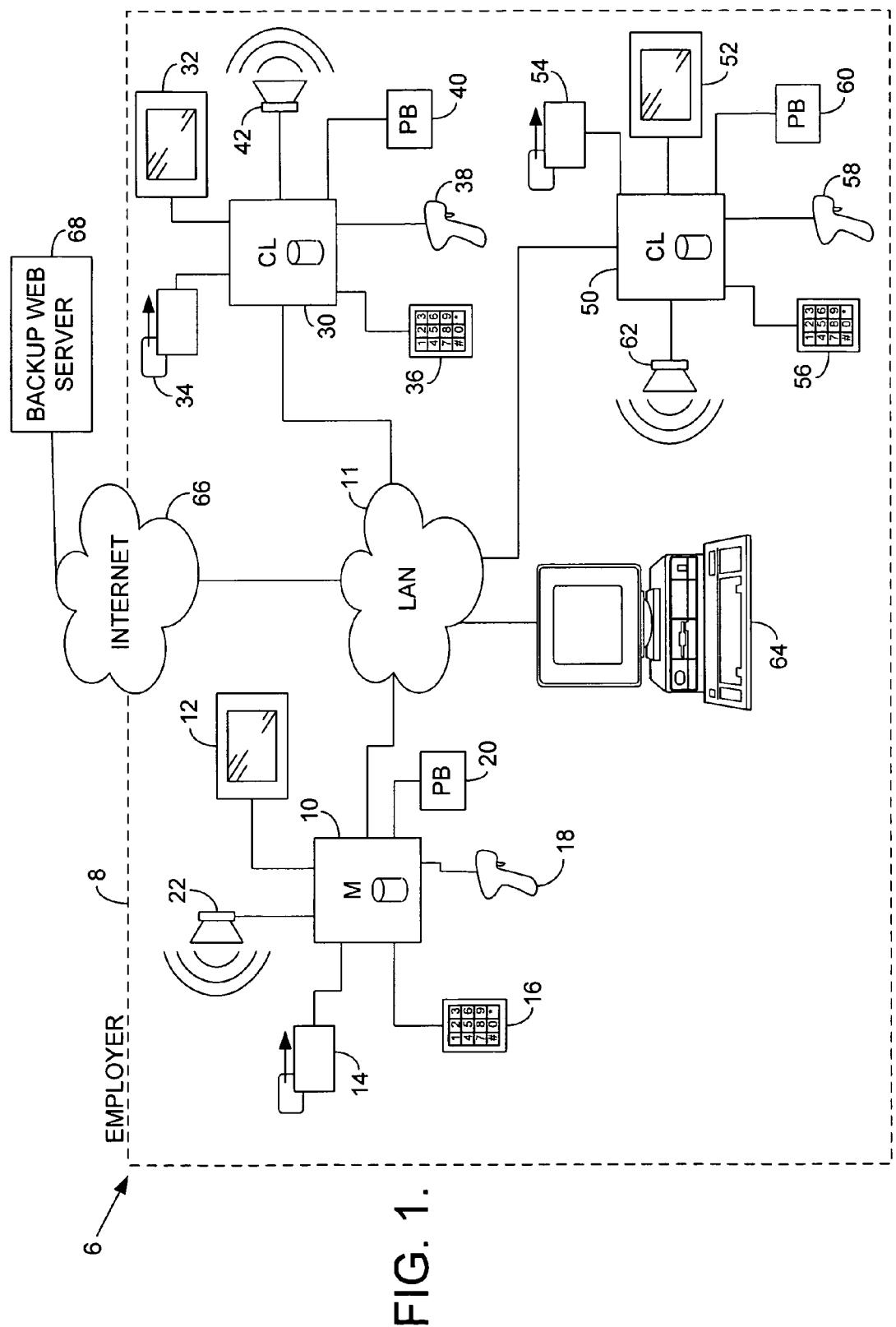
FIG. 1 is a high level schematic showing one embodiment of the time-keeping arrangement of the present invention.

The present invention provides a system and method for managing employee's work time. The system includes at least one, but possibly numerous network appliances which come with software already loaded and with at least some form of identification input device. The system also incorporates a speaker and LCD. These systems come ready to go. The user simply plugs the set into the facilities LAN, and it is ready to go.

The term "facility," as used in this specification is to be interpreted in its broadest sense. The term is not meant to require the presence of a building, or any particular kind of establishment. Rather, it is simply meant to be a location to which persons go to on a schedule which must be monitored.

The term "employer" as used throughout this specification is intended to mean a person responsible for monitoring the time persons are present in a facility. It is not required that the employer be associated with a business, or any other particular entity.

As one skilled in the art will appreciate, the present invention may be embodied as, among other things: a method, system, or computer-program product. Accordingly, the present invention may take the form of a hardware embodiment, a software embodiment, or an embodiment combining software and hardware. In terms of software, the time-keeping computing devices may each include a computer-program product that includes computer-useable instructions embodied on one or more computer-readable media.

Computer-readable media include both volatile and non-volatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information.

One embodiment of the systems of the present invention is shown in the schematic of FIG. 1. Referring to the figure, we see a system 6 for an employer 8. Employer 8 may have one centralized location, or have multiple different facilities in different locations. The invention is not location bound.

The system is centered around a plurality of computing devices. One example is time-keeping computing device 10 (shown including an "M" which designates it as the master in the system) with networking capabilities. As one skilled in the art, computing devices comprise memory components, processing components, and in most cases, some sort of network interface. This is the case with device 10. These components are comprised as a small webserver. The small webserver will be used in the manner discussed hereinafter. In the preferred embodiment, a TCP/IP network interface (e.g., Ethernet) has been used to include the device in a LAN. This is, of course, not the only type of interface which could be used by time-keeper 10. Other types of interfaces (e.g., USB) could be used as well and still fall within the scope of the present invention.

Time keeper 10, by way of its interfacing capabilities (Ethernet in the preferred embodiment), is easily incorporated into a local area network (LAN) 11. This LAN may be either wireless or hard wired. LAN's currently exist in most businesses already in both hard wired or wireless forms. It is important to note that any kind of network could be This makes device 10 easily adopted by any business having a LAN. The employer consumer simply purchases or otherwise acquires the device, brings it back to the office, and plugs it in either to a network interface on a PC computer on the network, or into a stand-alone network wall receptacle. It could also, however, easily be adapted to be incorporated into a wireless network.

Device 10 includes, at a minimum, some sort of reading device, and a display. The display shown in FIG. 1 connected to device 10 is an LCD 12. In the preferred embodiment, LCD 12 is adapted to, at a minimum, display text messages. These devices are very simple to construct and take up very little space, which makes them ideal for use with the system 6. More complex LCD or other display devices capable of displaying more complex content could be used as well, however. For example, it would still fall within the scope of the present invention if a display were to be used which could display images or even video. Such a display might be used to, e.g., display an image of an employees appearance so that security could identify a trespasser using an employee's badge without authorization. In the preferred embodiment, however, a basic text display enabled LCD has been selected in order to save costs while at the same time display necessary information.

LCD 12 will be used to display a variety of information. It will be involved in the set up process, will identify successful or failed clock ins and clock outs. This will enable employees to effectively interface with an application running on device 10 in order to accomplish successful clock ins and outs. Employees will clock in and out using one of a plurality of reader devices which will communicate to the application running on device 10.

One reading device included with device 10 in the figure is a slide card reader 14. Card readers like reader 14 will be well known to those skilled in the art, and have been used for numerous purposes, e.g., credit cards. They electronically and automatically recognize information derived from a magnetic strip located on the card. When this magnetic strip is run through the reader, information stored in the magnetic strip can be obtained and used for identification purposes. Here, cards will magnetic strips that include an employee's number will be introduced into reader 14 for the purpose of clocking in and clocking out employees. An employee, in order to clock in or out, simply slides his or her card through a slot provided in reader 14. These devices have been used for numerous purposes conventionally. When used for employee time-tracking purposes, these conventional readers were connected directly into a PC client on a network, and required that PC software be loaded onto that computer. Here, however, reader 14 is connected directly into device 10. Using reader 14, the employees are easily clocked in and out.

Another way employees can be clocked in and out is using a key pad 16. This keypad, in the preferred embodiment, has numbers from 0–9, an enter key, and a forward slash key. Such keypads are known in the art to be used for other purposes. Other keypad types, or other ways of manually communicating with device 10 would be used instead, however, and still fall within the scope of the present invention. Using keypad 16, employees will be able to punch in an employee number to clock in or out. The employee will be able to simultaneously observe success (or failure) of the clock in/out by looking at LCD 12. An application running on device 10 accomplishes these functions. Software for accomplishing this is available and the programming necessary will be within the skill of one in the art.

Still another way employees can clock in and out is using a bar code reader arrangement 18. Bar code readers and the software enabling their use will be known to those skilled in the art. Here, the bar code reader is connected directly into device 10 just like card reader 14 and key pad 16. Bar code reader 18 will be used to scan special badges which will be created using a badge creation process which will be discussed in more detail later.

Yet another way in which employees may be clocked in our out is using a proximity-badge reader 20. Proximity-badge reader 20 works with badges which are supplied by the employer. These badges have computer chips therein which are detectable by reader 20 and will identify the employee by number. In order to log in or out, the employee will simply hold the badge within a close proximity to the reader. Normally an audio tone will occur upon a successful read, and the employee is clocked in. Proximity badge readers are known in the art, and have been used by employers for clock-in purposes before. Normally as the part of an elaborate security or other employee management systems. Thus, these kinds of systems, used exclusively, will be known to those skilled in the art.

Though not shown specifically in the FIG. 1 embodiment, biometric reading devices, e.g., electronic fingerprint identification, DNA, or other like technologies could be used for reading an identification purposes.

The last remaining component connected to device 10 is an audio output device 22. In the preferred embodiment, output device is a simple low-cost speaker. This speaker will be used to play audio sounds based on employee clock-in and clock-out activities. For example, when employee John Smith clocks in for work, audio output device will play a particular sound which originates from a sound generator in device 10. The employees, including Mr. Smith, after hearing the sound over and over will know that it is associated with a proper clock-in. A different sound is used to signify a successful clock-out. Still another sound will be used when some problem exists with the clock-in. For example, if Mr. Smith is no longer authorized to work on a particular project, a sound will be made by output device 22 which will let him know that his clock in was not successful and that he needs to follow up with a supervisor.

Though simple digitized voice files are located on the time keeper to accomplish this. These files are read to play tones or other content as known in the art. Other tone generation equipment could, however, be used instead. Still other embodiments are possible. For example, the application on device 10 could be adapted to cause customized digitized files to play custom content instead. Referring to the example in the last paragraph, audio output device 22 could express a more specific message of "thank you for clocking in, John Smith" instead of a simple tone. Regardless of the arrangement, output device 22 gives the employee audio feedback which is valuable to avoid waste, e.g., unauthorized overtime.

It may be advantageous (but is not required) to add on additional networkable computing devices just like device 10. Referring to FIG. 1, a second networked computing device 30 is shown on the same LAN 11. This second computing device 30 might be added for any number of reasons. One might be that the employer's facility has two entrances. Adding second device will enable employees to clock in and out at two separate locations, but still be included in the same database maintained on the master computing device 10. Like master 10, the second computer is connected into LAN 11 via a TCP/IP interface which may be made into a PC network port or into a stand alone network receptacle. Referring to FIG. 1, it may be seen that second computing device 30 includes the letters "CL." This is so that it can be properly identified as a client to master 10. Second computing device 30 is part of an identical arrangement to that associated with first device 10. Similarly, device 30 has an LCD 32, a slide card reader 34, a keypad input device 36, a bar-code reader 38, a proximity badge reader 40, and an audio speaker 42. Each of these collateral devices connected into second computing device 30 function the same as the like devices connected into first computer 10. The function of the second computing device 30 is different from computing device 10 in how it undergoes the set up process. Further, in use, second computing device 30 will function as a client (CL) of the master (M) when in use.

It may also be seen that the FIG. 1 embodiment includes a third computing device 50 which is set up as a client of first computing device 10 just like the second computing device 30. It, like the others, has a network TCP/IP (e.g., Ethernet) interface which enables it to be connected into LAN 11. This device is essentially the same from a hardware standpoint as the first computing device 10 and the second computing device 30. Additionally, it has the same equipment connected into it. Like the other computing devices, third computing device 50 has an LCD readout 52, a slide-card reader 54, a keypad 56, a bar-code reader 58, a proximity-badge detector 60, and an audio speaker 62.

This FIG. 1 arrangement will be used to perform numerous functions which enable an employer to easily keep employee time and monitor employees. First, however, the system must be set up.

Before diving into the set-up details, however, it should be known how the system of the present invention (e.g., personnel computers, readers, LCD's, speakers) are packaged and marketed. This is because the packaging techniques are unique in and of themselves. Because the hardware includes merely a small, simple network device, e.g., devices 10, 30 and 50, plus whatever equipment accessories are included (e.g., readers, and LCDs, and speakers), the combination of devices included in each system may be contained in and marketed in a small box. This is possible because none of the individual components is very large. Additionally, there is no software necessary to go along with the system which must be loaded. This is because all of the software is pre-loaded onto the computing devices before they are sold. Each of these employee time-keeping devices, e.g., devices 10, 30, and 50 are designed to be sold separately. Each time-keeping computer will be packaged along with an LCD (e.g., LCD 12, LCD 32, LCD 52) and at least one form of reader (slide-card, bar code, keypad, or proximity badge).

Using time-keeper device 10 as an example, at least one, but likely more than one of the reader mechanisms 14, 16, 18, or 20, would be included with the device 10 in the same box. Also, one speaker (e.g., Speaker 22) would be included in the same box. One more or all of the reader devices could also be included in the same box. However, from a business standpoint it may make more sense to sell them separately as options and let the users select which particular reader is best for their purposes. Separate sales of each component is of course an option. But it is important to note, that the fact that the entire combination of components can be packaged in the same small box gives the system superior marketability because it may be easily displayed on the shelf.

Time-keeping computing devices 30 and 50 will be packaged the same way. Each time-keeper packaged separately with its associated equipment included. The fact that there is no difference in the way that time-keeper computing devices 10, 30, and 50 would be packaged.

From a hardware standpoint the systems are identical duplicates. Their differences being in function only. This difference is realized when master computer 10 is plugged in. It is plugged in first, and this in of itself makes it the master. Because clients 30 and 50 are plugged in later, they will automatically be set up as clients as what we describe in more detail hereinafter. If second time-keeper 30 or third time keeper 50 were the first device powered up in the overall system, they would automatically be treated as the master.

Because all of the time-keeper assemblies are the same, the user is able to buy one, two, or any number of systems as needed to cover different entryways or sections of a facility. Because all of the software is pre-loaded onto the computing devices which are sold to the consumer, there is no need to separately purchase, or load any software onto any of the computing devices, e.g., network station 64, on the LAN 11. This gives the present invention a tremendous advantage over the prior art methods of accomplishing this.

Once a consumer brings home one or more boxes filled with a computing device, (e.g., device 10), in a plurality of associated equipment (e.g., LCD 12, reader 14, and speaker 22), the set up process has been made easy. We will assume for this example that the first time-keeping computer 10 is the first to be set up on LAN 11.

To begin this process, first, the user will connect each piece of equipment (e.g., LCD 12, readers 14, 16, 18, and 20, and speaker 22) into the computing device 10. Alternatively, these devices could come already connected. But if not, they should be connected in using some form of connection known to those skilled in the art (e.g., USB, Ethernet, serial, parallel). Thus, all of the equipment—LCD 12, readers 14, 16, 18, and 20, and speaker 22 would all be connected.

Next, time-keeper computing device 10 should be connected into LAN 11 using a TCP/IP (e.g., Ethernet) connection. Other forms of network connectivity known to those skilled in the art could be used as well and still fall within the present invention, however. It could be any type of connectivity which enables networking.

All of the time-keeping computers of the preferred embodiment of the preferred embodiment work on standard AC power. Thus they include a power cord. The power cord should not be plugged in and powered up until all of the above connections are made. But once all the equipment has been connected into the time-keeper computer, and after the Ethernet connection into the LAN have been made, the time-keeper AC power cord may be plugged into a wall or other AC power outlet.

Once the time-keeper 10 receives power, its computing components will boot up. Immediately after powering up the system, a process running on computing device 10 causes it to search for other time-keeping computing devices on the system. It does this by scanning the entire LAN for another time-keeper. If another time keeper exists in the system, it will be recognized by a token which is a signature file on a master time-keeper already on the system.

In the case that no master-identifying token is present on the network, the small webserver in time-keeper 10 which has just been plugged in is flagged as the master time keeper on the network. It will be represented on the master when a token is created on the webserver which identifies it as such from that time forward.

If the time keeper is not the first time-keeping device on the system, it will recognize the token of the already-installed system and function as a client from that point on.

For example, in LAN 11 where first time-keeper 10 is the first time-keeper hooked into the LAN and powered up, a network token will be set for it and maintained on the network. Later added time-keeper computers, e.g., second computer 30 and third computer 50, will later be set up as clients.

But assuming time-keeping computer 10 is the first computer added, a process running on first computing device 10 will cause LCD 12 to display a message. This message instructs the user to open up a web browser on a client on the local area network (e.g., LAN 11) and then enter in a specified IP address which enables the web server on time-keeping device 10 to be accessed. For example, a user on network client 64 could do this by opening up the web browser on that device. Next, this user will simply enter the IP address displayed on LCD 12 in the web browser.

Once the IP address has been into the browser of the network client (e.g., client 64), the user will be accessing the small webserver in time-keeper 10 over the network. Thus, time keeper 10 is able to operate as the time-keeping server to the rest of the LAN 11.

Now that time-keeper 10 has been accessed by the client over the network, the user on client 64 will be presented with a set-up wizard. Set-up wizards are known to those skilled in the art, and those skilled in the art will know how to administer the necessary software in order to accomplish setting this up. This, however, is provided in the processes provided on computing device 10. At one point in this process, the user will set up a static IP address for the master station 10. This will enable the first computing device 10 to function as a master server to any clients later plugged in to the system. It also will enable users to bookmark web browsers so that they can access information contained in master 10 through their web browsers. This can be accomplished by anyone on LAN 11. Because the static IP address has been set, client stations (e.g., second computer 30 and third computer 50) when added to the network will be able to auto-configure and reliably connect to master computer 10. Setting a static IP address on the first computer 10 also enables other clients on the network (and also the world wide web) to access and manage the personnel-maintaining database maintained on computing device 10.

Next, a process running on first time-keeping computing device 10 will cause the presentation of a series of screens each having a plurality of fields which enable the user on network client 64 to enter information. The information entered to build a time-keeping database on in first time-keeping computing device 10.

The first thing entered into the database on time-keeper 10 is the employee's name. Next, a number is assigned to the employee. Once incorporated into the database, the employees number will be maintained and later used for clock-ins and clock-outs by that employee. The screen that is presented to the user for entry of a number automatically suggests a number for that employee. This number will be incremented one more than the employee entered just before it. This suggested, sequential number, however, may be manually replaced by the user with another number.

After the employee number has been set, the user is presented with another screen in which contact information (e.g., phone number, department information, supervisor, e-mail address, etc.) may be entered and then stored in the database on time-keeper 10.

In a next screen, employee-alert information can be entered. This information is used to specify circumstances in which emails will be transferred regarding employee-hours issues. These email alerts can take many forms. In one embodiment email alerts will be transmitted to supervisors or other persons as the result of predesignated alerts triggered by clock-in and clock-out activities or other events. In order to accomplish this, employees authorized schedules, overtime limits, and other restrictions placed on employee's hours are entered into the database. This is done by populating fields just like with the other information. The information entered, for example, would be an employees work schedule, number of hours scheduled to be worked that week, amount of overtime allowed (if any), as well as other information. All of this information is entered into and maintained on the database on time-keeper 10 for the purpose of later transmitting e-mail alerts when certain events occur.

The e-mail alert details are entered into fields located on a separate page. Each employee in this set up process can have three e-mail addresses associated with them. These are normally assigned to that employee, their manager, and another manager or supervisor or senior manager or payroll person or other person in the system. All of these individuals will be able to receive e-mail alert reports concerning the employee, that employee's schedule and clock events.

In the preferred embodiment, there are five types of e-mail alert reports available. Each of these five email alerts can be set up by selecting them from fields provided on pages and then selecting the email addresses of persons which are to receive the emailed reports on the occurrence of the reported event.

The first type of email-alert report is an "each clock" report. If the each-clock option is selected, a process running on time-keeper 10 will cause a report will be transmitted via e-mail to all of the interested parties on every occasion that particular employee clocks in or out.

A second type of e-mail alert only reports clock in or clock out errors. Setting up this error-only type of report will cause a process on time-keeper 10 to transmit an e-mail when there is some sort of clock error, e.g., an employee attempted to clock in, but there was a reader error. It would also cover other situations where the employee has clocked in or out incorrectly.

A third type of e-mail report that could be set up is an end of the week report. If this particular e-mail alert is set up in the system, a report will be transmitted to all of the pre-designated e-mail addresses at the end of each week. This detailed report will include all of the hours worked by the employee, and break down any of the other desired information regarding that employee for the whole week, e.g., overtime worked.

The fourth type of email alert which may be set up is an overtime alert. As noted already, the database will include the intended schedule for every employee. Thus, when that employee works more than the scheduled hours during a week, time-keeper 10 will know this. For many employers, it will not be sufficient to detect for overtime only at clock-ins because an employee might go into overtime and then work significant hours in one shift. To avoid these types of situations, continual monitoring is necessary. To accomplish this, a process running on computing device 10 will be run every five minutes to see if any employees are close to (e.g., within 15 minutes) or have already entered over into overtime status. If any of these situations occur, the process sends a message to all of the entered e-mail addresses notifying them that that employee is about to go on, or has already started on overtime. This greatly assists the management in being able to minimize the amount of overtime worked by employees.

The fifth, and last type of alert that can be set up is a schedule alert. Again, the database will include the intended schedule for every employee. Thus, when that employee clocks-in or clocks-out in a manner which is outside or otherwise inconsistent with the scheduled hours during a week, time-keeper 10 is able to detect this. Whenever an employee clocks in or clocks out in a manner that is inconsistent with his or her work schedule, a process running on computing device 10 will transmit an e-mail to prearranged e-mail addresses so that the employer will know of the irregularity. For example, if an employee is supposed to work until 5:00 but clocks out at 3:00, an e-mail will automatically be transmitted to their supervisor and other designated parties. This is very valuable to supervisors because they can immediately be notified if an employee will be unavailable because they have clocked out. It also will enable them to be notified if an employee is arriving before their scheduled time of arrival so that they can, e.g., be called to tasks rather than being idle.

Also for each employee, administrative information regarding that employee will also be entered into the database. This information will include the level of access for that employee into the system. For example, if the employee is not management, they will have a low level of access, and perhaps no access to the system whatsoever. A mid-level manager, however, may be given access to the system. The primary time-keeping administrator, would likely be given complete access. This access will be secured by user name and password in a manner known to those skilled in the art.

Other information that can be entered into the database regarding the employee is job-tracking information. New jobs may be set up with designated codes. These codes will then be entered as being authorized to work on a number of different job codes. In terms of clock ins, an employee working on a particular job code will have to type that code into the keypad 16 in addition to punching in his or her employee identification number. Alternatively, each employee could be given a plurality of cards or badges, each one representing a particular job. Once leaving an earlier job, and proceeding to another, this employee would have to clock out of one job code, then reenter under another. These job codes will be used to generate job tracking reports in which a manager can learn of all of the employees and all of the time worked with respect to a particular job. To accomplish this, a process on time keeper 10 records the time worked by the employee by code number entered. Thus, later on, if requested, the process is able to call up all the time worked by all employees on the particular job for cost determinations.

After all of the information regarding the employee has been entered into the system, in a next step, a summary page will be presented to the user. The summary page includes all of the information entered (through the series regarding that employee. This enables the user to identify any errors and make any corrections as necessary.

The process described in the paragraphs above is repeated over and over for numerous employees. For example, if there are 40 employees in the company, this process would have to be repeated 40 times until all of the information regarding all of the employees is entered into the database on computer 10. Alternatively, employees could be introduced in batch from a file or a network enabled application.

Once the information for all the employees has been entered, the employer should set up a preferred method, or methods in which employees may log in and log out. The systems of the present invention give the employer many options. One is card reader 14. The kind of card used in this type of reader will be known to those skilled in the art, as well as most consumers. These card-reader technologies are used for credit cards as well as other numerous technologies used in society today. The cards include pre-programmed magnetic strips. In the preferred embodiment, each system of the present invention (e.g., time-keeper 10, LCD 12, one or more of readers 14, 18, 20, key pad 16, and speaker 22 would constitute one such "system") in which card reader 14 is the selected reading device will include a plurality of preprogrammed magnetically stripped cards. The magnetic strip on each of these cards will include a different number. Preferably in sequential order. E.g., 1–20 if 20 cards are included. The designated employee numbers which match up with the numbers automatically displayed (by default) into the employee number field provided in the data entry screen for the employee described in the above-mentioned steps where the database is being built.

In addition to the ID number incorporated in the magnetic strip, a photo and other identification information may be added to the plastic cards. A process running on time-keeper 10 provides this service by giving the employer a page on which any desired employee information may be typed, e.g., name, date of birth, and a photo included. The photo may be incorporated into the card-ID creation page from JPEG images or other digital pictures which are incorporated into the database on time-keeper 10 from elsewhere. Ideally, these photos are downloaded into time-keeper 10. Then these files are extracted out, copied, and pasted into the card-creation screen where they are presented in printable form. Next, the photo ID with typed information can be printed on any printer (preferably a color printer) located on LAN 11. After being printed, the printout may be cut to size and adhered, taped (using transparent tape), or most preferably laminated to the magnetic cards provided.

The picture of the employee is not absolutely necessary as part of the clock in/clock out process, but is just provided as an extra which would enable an employer to identify the employee by picture. For larger businesses where the employees do not necessarily know one another this can be used to avoid the fraudulent process commonly referred to as of double-punching. This is where an employee clocks a friend in to work without the authorization of the employer. The photo allows the employer to match the card to the employee to avoid this fraud.

Once these magnetic laminated picture ID cards have been created, they can be distributed to the employees. The employees will then clock in and out by simply sliding their individual card through reader 14. From a marketing standpoint, in the preferred embodiment, these magnetic cards would likely be included in the same box with computer device 10 and the rest of the equipment upon purchase. This way, the employer is given a time-keeper device preloaded with software which already includes a numbering system along with magnetic cards which are pre-numbered to correspond to the numbers automatically set up by the process running on time-keeper 10. Thus, the employer is given a system that is ready to go without having to incorporate other systems on the LAN 11. This makes the set up incredibly simple, fast, and ideal for the typical business.

If one of the preferred methods of clocking in and out is using keypad 16, the users will simply punch in their employee number which will be given to them by a supervisor verbally or in writing. In the preferred embodiment, keypad 16 will be used in combination with another reader selected from the group of card-reader 14, bar-code scanner 18, and proximity-badge reader 20. It is a way to manually enter the employee numbers, job-code numbers, and other numbers.

Another optional form of reader which can be used is bar code reader 18. Bar code reader 18 may be used along with a special card creation process. These cards are created like those of the magnetic cards used in reader 14, except that instead of magnetic strips, the cards will have bar codes fixed to the back. Upon purchase, time-keeper 10 already has incorporated into its database an Adobe™ file which enables the user to print a plurality of bar codes. These bar codes relate to a number of badge numbers that have been assigned in the employee database when the employee information was entered. Each of the employees has a number. By using the application running on computer 10, the user is able to extract a plurality of bar codes which correlate to the employee numbers designated in the employee information entry process. By accessing time-keeper 10 through it a client (e.g., client 64), the user is able to extract a bar code (in Adobe format) which relates to that particular number. Alternatively, time-keeper 10 could come already equipped with a comprehensive Adobe™ file which includes bar scan codes for each of the badges (e.g., bar codes which represent employees 1–20). Once these bar codes have been printed, they may be laminated onto, or otherwise adhered to almost anything, e.g., a badge, etc. This makes them more adaptable than the magnetic cards. Further, an unlimited number may be created without having numerous cards provided with the kit. The bar codes can be printed on any printer on the LAN just like the pictures as described above. These bar codes, after being printed, may be laminated onto cards or badges along with the photo ID and typed information like with the card-reader 14 card creation process described above.

Once the bar-code ID for each employee is created, the badges are handed out. When an employee presents his or her badge and uses bar code reader on it, the application running on computing device 10 will recognize that badge as being associated with a particular employee's number. One skilled in the art of how bar-code scanners work will understand how this can be set up. Physically, the clocking in and out of employees will comprise passing the bar code of each badge within range of scanner/bar-code reader 18. The process running on time-keeper 10 then clocks the employee in or out accordingly.

If the proximity badge 20 arrangement is used, the employer simply would pass out a plurality of proximity badges (which preferably would be included with the kit upon purchase) which would include microchips which would be recognized by the proximity badge detector 20. These kinds of devices are known to those in the art. If proximity badges are used, these badges would be included in the kit along with the rest of the system. It is also possible that proximity badge chips could be included along with a magnetic strips as part of a two-in-one card. That way two different readers could be used on the same card.

Regardless of the manner of clock in (or clock out)—reader 14, keypad 16, bar code scanner 18, or proximity badge detector 20—the system of the present invention provides the employee with instant feedback with respect to whether the clock in has been successful or not. First, the user will be presented with a text message on LCD 12 indicating that the clock in has been successful. LCD 12 might also display that employee's name and other information it desired.

In addition to the visual feedback, the employee will also be given an audio feedback from speaker 22 upon clock in, speaker 22 will create a sound which will, in the course of time, be recognizable to the employee as a successful log in. If there is an error in the clock in process (or clock out process for that matter), the employee will be alerted to this by a text message on LCD 12 and also a tone being admitted from speaker 22 which indicates a failed clock in or clock out attempt. This has proved to be very beneficial to employees and prevents an employee working a whole day without having been clocked into the system.

Regardless of the manner of clock in, once an employee is clocked in, a process running on time-keeper 10 will automatically check to see if certain of the e-mail alerts are necessary. For example, if the "each clock" option has been pre-designated in the set up process for that employee, an e-mail message will automatically be transmitted when that employee clocks in or out. The email will go to the predesignated e-mail addresses as described above. If the clock in is unsuccessful, an error message may be sent to all of the interested e-mail addresses. Also, as described above there is a continual process which checks for schedule and overtime violations. If these occur, alerts will be transmitted.

Also, once an employee clocks in using one of the reader devices, the application running on time keeper 10 will note that employee as having clocked in status in the database. Once this employee is in clocked in status, an e-mail alert process is running on the computing device 10 will continually check for schedule alerts and overtime alerts if warranted.

It is important to recognize that although email has been disclosed as the preferred manner of making alert notifications above, that other forms of notification could be used as well and still fall within the scope of the present invention. For example, paging, wireless messaging to cell phones, PDA's, Blackberry devices, etc., could be substituted and still fall within the scope of the present invention.

A showing of all the employees clocked in may be displayed on LCD 12. This will likely be a default screen on LCD 12 as well as accessible over any workstation on the LAN. Once a plurality of employees have clocked in, the application running on computing device 10 maintains those employees on a page that is accessible by an employer. Referencing this page, the employer can immediately ascertain who is at work. Additionally, it may be advisable for this list as employees who are included as clocked into the system to be displayed on LCD 12.

That completes the description for setting up and using a system in which only one computing device, e.g., first time-keeping network appliance 10, is plugged into LAN 11. In the case in which a second device is desired to be added into the system, the process will be largely the same as that described for first time keeper 10. However, when an additional computing device, e.g., second computing device (CL) 30 is first powered up, a process running on it will check the entire network on LAN 11 to determine whether another personnel computing device exists on the network. Like with original time-keeper 10, second time keeper 30 does this by scanning for another system token which would identify another time keeper on the LAN 11.

In this case, unlike with before, second time keeper 30 would recognize the token which has already been set up on the webserver in time keeper 10 which would already appear in LAN 11. This token would represents that a master time keeper (first time keeper 10) already exists on the network and thus, that second time keeper 30 should be set up as a client.

Because second time keeper 30 is now set up as a client (CL) to master time keeper 10 the database on second computer 30 will not be used to store any of the employee information or store any of the clock in/clock out information. Second time keeper 30 will instead access this information by interfacing with master time keeper 10. Clock in and out information obtained using the equipment on second time keeper 30, e.g., slide card reader 34, keypad input device 36, bar-code reader 38, and proximity badge reader 40, will be maintained on the database on the first master time keeper 10.

The same is true at a later time when a user decides to add a third personnel computing device 50 to the system. This computing device, just like the second computing device 30, will first check the entire network (LAN 11) to see if any other personnel computing devices exist. It will discover then on the network that first time keeper 10 has already been set up as the master in the system. Then, it, like second computing device 30 will be set up as a client 50 to the master first time keeper 10 on the system. All the clock in/out information received from the equipment associated with third time keeper 50, e.g., slide-card reader 54, a keypad 56, a bar-code reader 58, a proximity-badge detector 60, will be maintained on master 10.

Because these computing devices (time keepers 30 and 50) are functioning as clients, the result is a master database which relies on all set up employee information, and clock in/out information being kept and maintained in one place. By using a web browser from anywhere in the LAN 11, or any where on the internet for that matter, a user is able to locate any of the necessary information and make any changes necessary to the employee information maintained on the database.

Because the data kept and maintained on the time keeper device master tends to be important to the business, it is advisable that the user maintain up to date backup files of the information maintained on the computing device. This may be done on a client, e.g., client 64, on the LAN 11. Alternatively, however, backup information could be maintained over an internet connection 66 on a backup web server 68. A process running on the time keeper devices functions during set up to automatically enable the user to back up the employee and company data offsite. By selecting this option, the user simply creates security information (e.g., password). The process running on the time keeper is preconfigured to be directed to the host name of an off-site backup server. Backup data is continually stored under the system serial number and password and can be called up to be restored at any time. This backup web server 68 could be maintained anywhere, but in the preferred embodiment, it is maintained on the premises of the seller of the time keepers and suggested as an added feature.

Consideration of the embodiment disclosed above causes one to realize that the systems described would enable an employer to accomplish numerous objectives by introducing devices such as first 10, second 30, third 50, or numerous other like computing devices into a LAN or over the internet in many different combinations in order to accomplish numerous different objectives in numerous different ways.

The present invention and its equivalents are well-adapted to provide a new and useful method of introducing networked personnel computing devices into the existing systems of a facility using the products described above. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. It will be understood that certain features and subcombinations are of utility and may be employed without reference to other features and subcombinations and are contemplated within the scope of the claims. Not all steps listed in the various figures need be carried out in the order described.

The invention claimed is:

1. An employee time keeping arrangement for use with a local area network (LAN), said arrangement comprising:
   a first time-keeping network appliance including a network interface, said first time-keeping network appliance being adapted to scan the LAN and to recognize any other substantially identical time-keeping network appliances on said LAN;
   said first appliance adapted to configure said first appliance as a master device if no other substantially identical time-keeping network appliances are located in the LAN;
   said first appliance adapted to configure said first appliance as a client if a second substantially identical time-keeping network appliance is already located in the LAN;
   said first appliance further adapted to send and receive and store employee information;
   said first appliance process being further adapted to cause an IP address to be displayed which enables a user to access said time keeper from a web browser on a client computer on said network by entering said IP address into said web browser;
   said arrangement also including a reader for receiving identification information from an employee; and
   a feedback system including one of an audio output device and a display, said feedback system adapted to inform a presenter of said item of whether a reading by said reader has been successful.

2. The arrangement of claim 1, wherein said feedback system comprises:
   an audio speaker.

3. The arrangement of claim 1, wherein said feedback system comprises:
   an LCD display.

4. The arrangement of claim 1, wherein said reader comprises at least one of:
   a magnetic card reader, a key pad, a bar-code scanner, a proximity badge reader, and a biometric reader.

5. A method of providing an employer with a timekeeping system, said method comprising:
   providing a first time-keeping network appliance which includes a network interface;
   preloading software on said appliance;
   adapting said software such that said first appliance, when first introduced to a local area network (LAN) searches for any other timekeeper devices, configures as a master server if no other timekeeper devices are found, and configures as a client if a second timekeeper device is found said first and second timekeeper devices being substantially identical;
   further adapting said software such that upon startup it displays an IP address which if entered into a web browser on said network enables a user to access a process on said first appliance which enables said user to set up a static IP address for said first appliance which enables network access to a personnel database on said first device;

providing a reader along with said first appliance, said reader adapted to detect the presence of an employee-identifying item when said item is presented to said reader;

including a feedback system including one of an audio output device and a display, said feedback system adapted to inform a presenter of said item of whether a reading by said reader has been successful;

adapting said software to receive employee information and retain said employee information in a database; and further adapting said software to receive and store employee clock in and clock out information in said database.

6. The method of claim 5, said method comprising:

including a process in said software which enables the user to print bar codes for the creation of said employee identifying item.

7. The method of claim 5, said method comprising:

including a process in said software which enables the user to create a photo ID card.

8. The method of claim 5, said method comprising:

including a process in said software which enables the user to generate a job-tracking report of all the hours worked on a project.

9. The method of claim 5, said method comprising:

including a process in said software which causes an email alert to be transmitted every time an employee clocks in or out.

10. The method of claim 5, said method comprising:

including a process in said software which causes an email alert to be transmitted every time an employee one of: (i) clocks in at an unscheduled time for that employee, and (ii) clocks out at an unscheduled time for that employee.

11. The method of claim 5, said method comprising:

including a process in said software which causes an email alert to be transmitted at the end of a particular work period, said alert including a total number of hours worked that period.

12. The method of claim 5, said method comprising:

including a process in said software which causes an email alert to be transmitted when an employee is on our about to go overtime.

13. The method of claim 5, said method comprising:

including a process in said software which causes said time keeper to be directed to an off-site backup server when a selection is made during a set up process.

14. The method of claim 5, said method comprising:

including a token which is a signature file on said first time-keeping network appliance so that when a second time-keeping network appliance is added to said LAN, said second appliance will act as a client.

15. A time-keeper device for a business, said device useable in a local area network associated with said business said device comprising:

a network interface enabling inclusion in said LAN;

a reader for detecting when an employee clocks in or out;

a communicating device which indicates to one of an employee and another when a successful clock-in or clock-out has occurred;

a database for saving clock-in and clock-out information;

preloaded software, said software adapted to determine whether any other substantially identical timekeeping devices exist on said LAN, and if not, configures said device as a master which will maintain said information for time-keeping purposes;

said software further adapted to configure said device as a client if an earlier-connected timekeeper exists on the system and then transmit said information to said earlier-connected time-keeper for the purpose of maintaining said information for time-keeping purposes;

a process in said software which-sends email alerts on the event of one of a clock-in or a clock-out; and a first appliance process being further adapted to cause an IP address to be displayed which enables a user to access said time keeper from a web browser on a client computer on said network by entering said IP address into said web browser.

* * * * *